No. 733,162. PATENTED JULY 7, 1903.
J. M. CONROY.
SUPPORT FOR MIRRORS.
APPLICATION FILED DEC. 5, 1902.
NO MODEL.
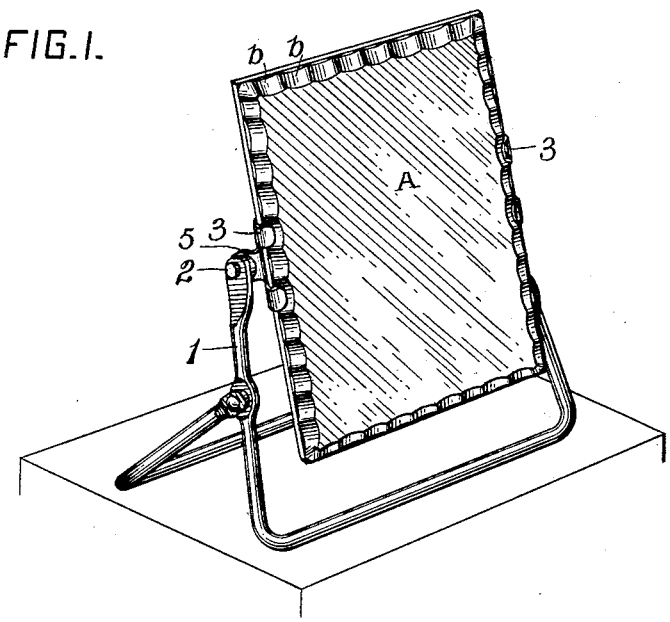
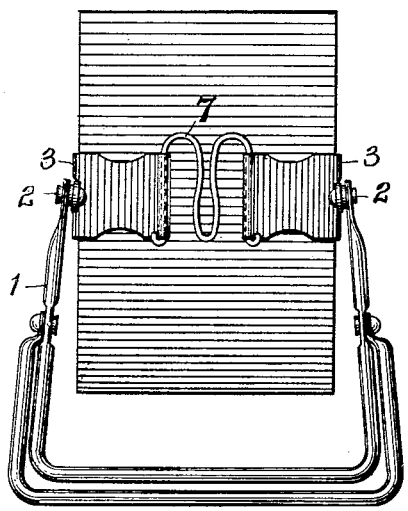
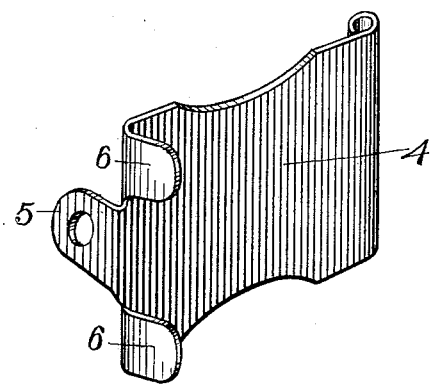
WITNESSES:
Herbert Bradley.
Fred H. Kirchner.
INVENTOR
John Marcellus Conroy
by Bayard H. Christy Atty No. 733,162. Patented July 7, 1903.

UNITED STATES PATENT OFFICE.

JOHN MARCELLUS CONROY, OF ALLEGHENY, PENNSYLVANIA.

SUPPORT FOR MIRRORS.

SPECIFICATION forming part of Letters Patent No. 733,162, dated July 7, 1903.

Application filed December 5, 1902. Serial No. 134,051. (No model.)

*To all whom it may concern:*

Be it known that I, JOHN MARCELLUS CONROY, a citizen of the United States, residing at Allegheny, in the county of Allegheny and State of Pennsylvania, have invented or discovered certain new and useful Improvements in Supports for Mirrors, of which improvements the following is a specification.

My invention relates to supports for mirrors; and the object of my invention is to provide a mirror-support which will be simple and efficient in use and one which may be made at small cost.

In the accompanying drawings, which form part of this specification, Figure 1 is a perspective view of my improved mirror-support with a mirror borne by it. Fig. 2 is a rear elevation of the same; and Fig. 3 is a perspective view, on larger scale, of one of the clips of the support detached from the other parts.

Parts repeated in the several figures of the drawings bear the same reference-numerals in every case.

As shown in the drawings, the mirror-support consists of two parts—a standard 1 and a mount for the mirror, and my present invention immediately concerns the latter part—that is, the mount. This mount consists of a pair of clips 3 3, adapted to engage opposite edges of the mirror to be supported, the two clips being united or firmly secured when in operative position, thus clamping the mirror securely. As illustrated in Fig. 3, each clip consists, essentially, of a body portion 4, a backward-extending lug 5, and one or more forward-extending lugs 6. The body portion 4 is adapted to extend upon the back of the mirror when the clip is in place. The lug 5 is adapted to make engagement with the standard, being preferably pivoted to the standard, and the lug or lugs 6 are adapted to engage the edge of the mirror when the clip is in place. I preferably form the clips of metal and of a metal which may be bent, so that when the clips are applied lugs 6 may be pressed into contact with the edges of the mirror.

I preferably unite the pair of clips 3 3, which engage the opposite edges of the mirror, by interposing another member, which I secure to the body portions 4 of the two clips. Fig. 2 shows my preferred construction in this particular. The connecting member, as there shown, consists of an M-shaped spring 7. I find a spring connection preferable, for it permits the insertion and removal of the mirror without readjustment of the parts.

The standard, which, with the mount described above, constitutes the mirror-support, may be of any desired construction; but it is essential that it be adapted to make connection with the lugs 5 of the clips, and, as I have already stated, I prefer that this connection be a pivotal connection, as indicated at 2.

My improved mirror-support is peculiarly applicable to mirrors having beveled edges, and more particularly to those having "chipped" bevel edges. A mirror of this nature is illustrated at A, Fig. 1. The surface of the bevel is not plane, but consists of a series of concavities $b\ b$, produced by the removal of chips after a manner known in the art. The size of the mirror is not an essential feature of the invention; but, as the drawings indicate, I have found practical application for it in connection with mirrors of a size commonly termed "hand-mirrors."

The advantages of the mirror-support embodying my invention may readily be appreciated. Among them are these: The clips may be stamped from sheet metal and may therefore be cheaply made. When made from sheet metal and bent into conformity with the edge of the mirror and secured, the clips will not chip or "bur" the edge of the mirror, as rigid clips are apt to do. The flexible clip is peculiarly applicable to chipped-bevel mirrors, since in manufacturing them variations which occur in the thickness of the glass of which they are made result in variations in the inclination of the bevel. A flexible clip is adjustable to such variations; but a rigid clip is not adjustable. A clip having a plurality of forward-extending lugs is advantageous, both because a more secure connection is had for any mirror and in case of chipped-bevel mirrors the lugs may be pressed into a plurality of concavities in the bevel, and the mirror cannot then slip from the mount. By reason of the fact that the lugs which afford connection between the clips and the standard extend backward from the clips the mirror is held out or projects from the support, and it has on that account a more attractive appearance. If the two clips, which together compose a mount for a mirror, are united by a spring, as I prefer to unite them, the mount adjusts itself to the small variations which occur in the width of the mirrors.

I claim as my invention—

1. In a support for a mirror, the combination of a standard, clips engaging the edge of the mirror on opposite sides and connected to the standard, said clips having body portions extending inwardly from the edge upon the back of the mirror, and a spring engaging the body portions of the oppositely-placed clips, substantially as described.

2. A mount for a mirror which consists of a pair of clips, each clip having a body portion and lug flexible upon the body portion, a spring engaging the body portions of said clips and a standard pivotally connected to said clips, substantially as described.

3. The combination of a mirror having a chipped bevel edge, flexible clips bent in the irregularities of the edge of the mirror on opposite sides thereof, a resilient member lying upon the posterior surface of the mirror and engaging the oppositely-placed clips, and a standard connected to said clips, substantially as described.

In testimony whereof I have hereunto set my hand.

JOHN MARCELLUS CONROY.

Witnesses:
F. E. GAITHER,
HERBERT BRADLEY.